US010939666B2

(12) United States Patent
Van Curen et al.

(10) Patent No.: US 10,939,666 B2
(45) Date of Patent: Mar. 9, 2021

(54) BARK CONTROL DEVICE AND METHOD

(71) Applicant: E-Collar Technologies, Inc., Garrett, IN (US)

(72) Inventors: Greg Van Curen, Fremont, IN (US); Ho-Sung So, Seoul (KR)

(73) Assignee: E-Collar Technologies, Inc., Garrett, IN (US)

( * ) Notice: Subject to any disclaimer, the term of this patent is extended or adjusted under 35 U.S.C. 154(b) by 397 days.

(21) Appl. No.: 15/651,483

(22) Filed: Jul. 17, 2017

(65) Prior Publication Data
US 2018/0249680 A1 Sep. 6, 2018

(30) Foreign Application Priority Data

Mar. 6, 2017 (KR) .......................... 10-2017-0028144

(51) Int. Cl.
*A01K 15/02* (2006.01)
*A01K 27/00* (2006.01)
*A01K 29/00* (2006.01)

(52) U.S. Cl.
CPC .......... *A01K 15/022* (2013.01); *A01K 27/001* (2013.01); *A01K 27/007* (2013.01); *A01K 27/009* (2013.01); *A01K 29/005* (2013.01)

(58) Field of Classification Search
CPC ... A01K 15/021; A01K 15/022; A01K 27/009
See application file for complete search history.

(56) References Cited

U.S. PATENT DOCUMENTS

| 4,947,795 A * | 8/1990 | Farkas ................. A01K 15/022 119/718 |
| 5,911,198 A * | 6/1999 | Curen ................. A01K 15/021 119/720 |
| 5,913,284 A * | 6/1999 | Van Curen .......... A01K 15/021 119/718 |
| 5,927,233 A | 7/1999 | Mainini et al. |
| 8,757,098 B2 * | 6/2014 | So ........................ A01K 15/021 119/719 |
| 8,833,309 B2 * | 9/2014 | So ........................ A01K 15/021 119/712 |
| 8,881,686 B2 * | 11/2014 | So ........................ A01K 15/021 119/712 |
| 10,159,219 B2 * | 12/2018 | Van Curen .......... A01K 15/022 |
| 2005/0145200 A1 * | 7/2005 | Napolez ............... A01K 15/022 119/718 |
| 2006/0011144 A1 * | 1/2006 | Kates ..................... A01K 15/02 119/719 |
| 2006/0011145 A1 * | 1/2006 | Kates ..................... A01K 15/02 119/719 |

(Continued)

*Primary Examiner* — Magdalena Topolski
*Assistant Examiner* — Morgan T Barlow
(74) *Attorney, Agent, or Firm* — Taylor IP, P C.

(57) ABSTRACT

A dog bark control device which includes a first sensor, a second sensor, a stimulation applying means, and a control unit. The control unit determines whether the animal barks, and when the animal is determined to bark, operates the stimulation applying means to apply stimulation to the animal. The control unit determines that the animal barks when the first sensing signal of the first sensor is a signal indicating that the animal barks, and at the same time, the animal is determined to make a particular motion accompanied by barking from the second sensing signal of the second sensor.

17 Claims, 4 Drawing Sheets

(56) References Cited

U.S. PATENT DOCUMENTS

| | | | |
|---|---|---|---|
| 2010/0050954 A1* | 3/2010 | Lee, IV | A01K 15/022 |
| | | | 119/718 |
| 2011/0061605 A1* | 3/2011 | Hardi | A01K 15/021 |
| | | | 119/721 |
| 2013/0112153 A1* | 5/2013 | So | A01K 15/021 |
| | | | 119/720 |
| 2013/0113612 A1* | 5/2013 | Curen | G08C 17/02 |
| | | | 340/12.5 |
| 2013/0180467 A1* | 7/2013 | Wong | A01K 15/022 |
| | | | 119/718 |
| 2014/0251232 A1* | 9/2014 | Bianchi | A01K 15/021 |
| | | | 119/720 |
| 2015/0128878 A1* | 5/2015 | Van Curen | G06K 9/00671 |
| | | | 119/721 |
| 2015/0156990 A1* | 6/2015 | Van Curen | A01K 15/021 |
| | | | 119/720 |
| 2016/0015004 A1* | 1/2016 | Bonge, Jr. | A01K 27/009 |
| | | | 119/718 |
| 2016/0100552 A1 | 4/2016 | So et al. | |
| 2017/0079247 A1* | 3/2017 | Womble | A01K 27/009 |
| 2017/0251633 A1* | 9/2017 | Womble | A61B 34/10 |
| 2018/0153138 A1* | 6/2018 | Goetzl | A01K 15/022 |
| 2018/0228130 A1* | 8/2018 | Van Curen | A01K 15/023 |
| 2018/0303066 A1* | 10/2018 | Weimin | A01K 15/022 |
| 2018/0338472 A1* | 11/2018 | Kinsley | A01K 27/009 |
| 2018/0368365 A1* | 12/2018 | Van Curen | A01K 15/022 |
| | | | 119/718 |
| 2019/0104707 A1* | 4/2019 | Gotts | A01K 27/009 |
| 2020/0068854 A1* | 3/2020 | Belhomme | G01S 19/13 |

\* cited by examiner

BARK CONTROL DEVICE AND METHOD

TECHNICAL FIELD

The present disclosure relates to a bark control device and method which senses animals, for example, dogs bark and applies stimulation to the animals.

BACKGROUND ART

Animals, for example, dogs bark, typically when strangers approach, and such behaviors are for giving alert signals to strangers or owners, but in many cases, barks may be threats or noise to persons coming near or neighbors.

Accordingly, as animal bark control means, an animal training device (hereinafter referred to as a collar) is well known (see Patent Literature 1), in which an electronic device is worn on the body (typically, the neck) of an animal to apply stimulation such as electrical impact, and a sensor is embedded in the electronic device to sense the animal bark, so that stimulation is applied to the animal when the animal barks.

Animal training devices including the bark control system of Patent Literature 1 generally use, as a sensor to sense an animal bark, for example, a piezoelectric device which senses vibration of the animal's vocal cords and outputs electrical signals, and a microphone device which senses barking sound of the animal and determines the animal's bark.

A piezoelectric device has advantages; low cost and low power consumption, but disadvantages are that a piezoelectric device fails to (cannot) sense an animal bark when collar is worn away from the the animal's vocal cords, or a piezoelectric device may incorrectly sense an animal bark from vibration produced when the animal eat.

On the other hand, a microphone device is more expensive and consumes more power than a piezoelectric device, and because each animal barks at different frequencies or waveforms of sound waves, in order to achieve accurate sensing, it is necessary to store barking sound of an animal wearing collar in memory or large amounts of comparative data, and this process must be tedious. Moreover, a microphone device has a risk of incorrectly sensing ambient noise, especially barking sound of another animal in nearby place, as barks of an animal wearing collar.

Patent Literature 1 discloses an animal bark control system in which a piezoelectric device and a microphone device are used together, and an animal is determined to bark when the sensing results from the two sensors match. This system has a significant reduction in faulty sensing, but most of all, the problems of a microphone device with high cost, high power consumption, inconvenience of storing comparative data, and dealing with noise still remain unsolved.

RELATED LITERATURES

Patent Literature

Patent Literature 1: U.S. Pat. No. 5,927,233

DISCLOSURE

Technical Problem

In view of the problems of the related art, the present disclosure is directed to providing an animal bark control device and method for accurately sensing animals bark.

Technical Solution

To achieve the object, upon careful observations, the inventors found that animals, in particular, dogs raise their heads to bark. Based on the findings, the invention determines animals' bark by use of outputs from two sensors, a conventional sensor such as a piezoelectric device or a microphone device, and a motion sensor for sensing animals' head raising motion.

That is, a device according to an aspect of the present disclosure is an animal bark control device worn on a body of an animal to apply stimulation to the animal when barking of the animal is sensed to stop the animal from barking, and includes a first sensor configured to sense barking of the animal and output a first sensing signal, a second sensor configured to sense a motion of the animal and output a second sensing signal, a stimulation applying means configured to apply stimulation to the animal, and a control unit configured to receive inputs of the first sensing signal and the second sensing signal, determine whether the animal barks, and when the animal is determined to bark, operate the stimulation applying means to apply stimulation to the animal, wherein the control unit is programmed to determine that the animal barks when the first sensing signal is a signal indicating that the animal barks, and at the same time, the animal is determined to make a particular motion accompanied by barking from the second sensing signal.

Furthermore, a method according to another aspect of the present disclosure is an animal bark control method in which when barking of an animal is sensed, stimulation is applied to the animal using a device worn on a body of the animal to stop the animal from barking, and includes receiving, by a control unit, input of a first sensing signal from a first sensor which senses barking of the animal, receiving, by the control unit, input of a second sensing signal from a second sensor which senses a motion of the animal, determining, by the control unit, whether the animal barks from the first sensing signal and the second sensing signal, and operating, by the control unit, a stimulation applying means to apply stimulation to the animal when the animal is determined to bark, wherein the determining whether the animal barks comprises determining that the animal barks when the first sensing signal is a signal indicating that the animal barks, and at the same time, the animal is determined to make a particular motion accompanied by barking from the second sensing signal.

According to the embodiment, the second sensor is an acceleration sensor, and the control unit determines that the animal makes the particular motion accompanied by barking when a change in inclination of the device to the ground, calculated from the second sensing signal, is more than or equal to a predetermined reference value, or when acceleration or velocity of the device in a direction perpendicular to the ground, calculated from the second sensing signal, is more than or equal to a predetermined reference value.

Furthermore, according to the embodiment, the second sensor is a gyro sensor, and the control units determines that the animal makes the particular motion accompanied by barking when an angular acceleration or an angular velocity of the device to the ground, calculated from the second sensing signal, is more than or equal to a predetermined reference value.

Furthermore, according to the embodiment, the first sensor may be a piezoelectric device which receives input of vibration of the vocal cords of the animal, and converts it to an electrical signal and outputs the electrical signal, or a microphone device which receives input of barking sound of the animal, and converts it to an electrical signal and outputs the electrical signal.

Furthermore, preferably sensitivity of the first sensor and/or the second sensor is adjustable.

Furthermore, the animal bark control device may further include a counter and a display, and the control unit may be configured to increase a value of the counter by one each time the stimulation applying means operates and display the value on the display.

Advantageous Effects

The present disclosure simultaneously considers outputs from a conventional first sensor and a second sensor for sensing a particular motion of an animal when determining the animal's bark, to achieve more correct determination of the animal's bark. Thus, for example, when the first sensor is a piezoelectric device, an eating motion of an animal may be incorrectly determined to be barking, or for example, when the first sensor is a microphone device, barking of another animal in nearby place may be incorrectly determined to be barking of a corresponding animal, but according to the present disclosure, the faulty sensing problem can be overcome in a simple and low-cost manner.

DETAILED DESCRIPTION

Figure 1:
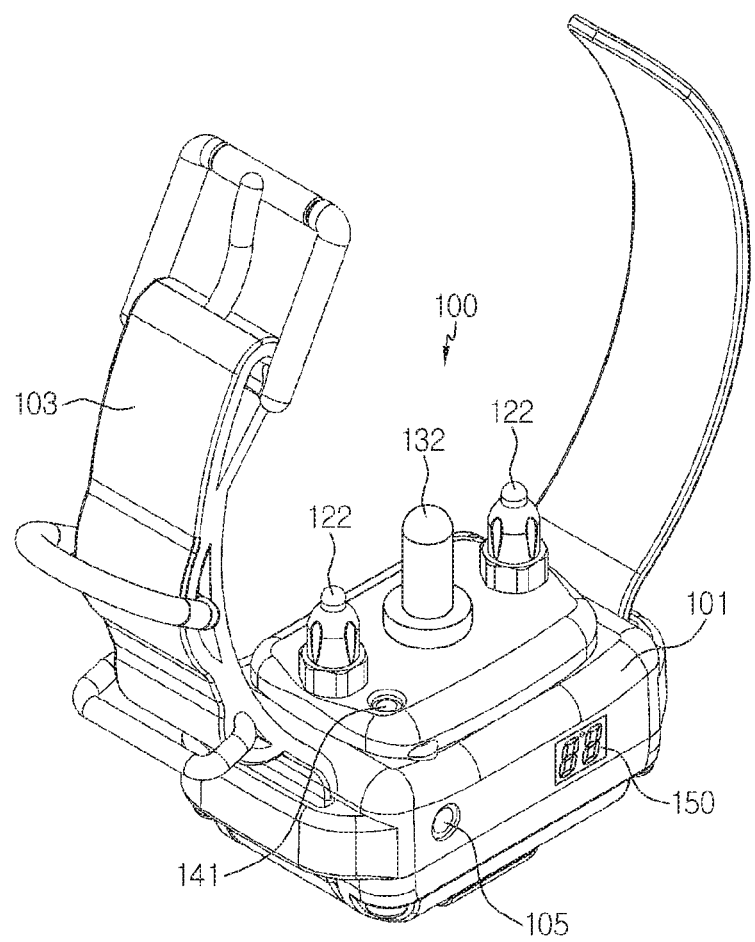
FIG. 1 is a schematic perspective view showing the appearance of an animal bark control device according to an embodiment of the present disclosure.

Hereinafter, an animal bark control device and method according to a preferred embodiment of the present disclosure is described in detail with reference to the accompanying drawings.

Meanwhile, the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Accordingly, the embodiments stated herein and illustrations in the drawings are just a preferred embodiment of the present disclosure and do not fully represent the technical aspects of the present disclosure, so it should be understood that various equivalents and modifications as an alternative could be made thereto at the time the application is filed.

First, the inventors explain the observation results of barking motion of animals, in particular, dogs, and the basic concept of the invention based on them.

Barking of dogs is largely classified into two. First, dogs groan to passively express inconvenience or pain, and second, dogs bark to actively alert strangers or owners. Additionally, in some cases, dogs growl with a deep and low pitch to strangers before or in the middle of the second barking behavior.

Particularly, going into details of the second barking motion, it is general that dogs not only make sounds but also raise their heads from a minimum of 5 degrees or less up to 30 degrees or greater when barking. Moreover, when barking, dogs make barking sounds 'bowwow' and at the same time, raise their heads. That is, the barking sound temporally matches the head raising motion.

Accordingly, barking of a dog is sensed using a conventional piezoelectric device or microphone device (first sensor) (signals from barking sounds), and at the same time, a particular motion, i.e., a head raising motion accompanied by barking of the dog is sensed using a motion sensor (second sensor), and when the outputs of the two sensors are identified at the same time, the dog is determined to bark.

Here, earlier technology to sense dogs bark using a piezoelectric device or microphone device is well known and its detailed description is omitted herein, and hereinafter a method which senses a particular motion, i.e., a head raising motion accompanied by barking of an animal using a motion sensor is described.

The motion sensor that can be used in the present disclosure includes an acceleration sensor and a gyro sensor. The acceleration sensor can measure acceleration in x, y, z axis directions, and the inclination of the acceleration sensor (i.e., collar having the embedded acceleration sensor) to the ground (i.e., xy plane) is calculated by resolving the acceleration measured at a particular point in time, i.e., gravitational acceleration, in x, y, z axis directions. Thus, when an inclination change of the collar for an amount of time (for example, 0.1 second) during which the barking sound of the dog is sensed by the first sensor is more than or equal to a predetermined reference value, the dog may be determined to raise the head. Here, the predetermined reference value, for example, +3 degrees or greater or +5 degrees or greater, may be set for various types of dogs through trials and errors.

Alternatively, when simply the acceleration or velocity of the acceleration sensor (collar) in the direction (z-axis direction) perpendicular to the ground is more than or equal to a predetermined reference value, the dog may be determined to raise the head.

On the other hand, the gyro sensor is a chip type sensor made typically using MEMS technology, and can measure the rotational angular velocity or angular acceleration of objects. Accordingly, similar to the acceleration sensor, when the angular velocity or angular acceleration of the collar to the ground measured from the gyro sensor (second sensor) for an amount of time (for example, 0.1 second) during which the barking sound of the dog is sensed by the first sensor is more than or equal to a predetermined reference value (for example, angular velocity is 30 degrees/sec or greater or 50 degrees/sec or greater), the dog may be determined to raise the head.

As described above, the present disclosure simultaneously considers the outputs from a conventional first sensor and a second sensor for sensing a particular motion of an animal when determining the animal's bark, to achieve more correct determination of the animal's bark. Thus, for example, when the first sensor is a piezoelectric device, an eating motion of an animal may be incorrectly determined to be barking, or for example, when the first sensor is a microphone device, barking of another animal in nearby place may be incorrectly determined to be barking of a corresponding animal, but according to the present disclosure, the faulty sensing problem can be overcome in a simple and low-cost manner.

Here, it is important that the present disclosure does not determine an animal's bark only based on signals from the acceleration sensor (second sensor), but determines barking of an animal based on whether signals from the second sensor temporally match in the time range in which barking of the animal is determined by the first sensor, causing significant changes. Accordingly, when waveform changes on the time axes of first sensing signals from the first sensor and second sensing signals from the second sensor match, the animal is determined to bark. In this instance, it is necessary to set a predetermined reference value for determining whether the second sensing signals from the second sensor caused significant changes, but there is no need to set the 'predetermined reference value' too strictly (too high), and even though the reference value is loosely set to, for example, 'higher than 0', the effect in significantly improving the sensing accuracy is obtained as compared to the conventional device using only the conventional first sensor.

Subsequently, an animal bark control device and method according to a specific embodiment of the present disclosure is described in detail with reference to the accompanying drawings.

FIG. 1 is a schematic perspective view showing the appearance of an animal bark control device according to an embodiment of the present disclosure.

As shown in FIG. 1, the animal bark control device according to an embodiment of the present disclosure (simply referred to as a 'device' or 'collar') is worn on the body (typically around the neck) of an animal by supporting means such as a belt 103, and includes a housing 101 in which the circuit components that make up the collar 100 are embedded, and electrodes 122 which serve as electrical stimulation applying means and protrude from regions (the upper surface in FIG. 1) that touch the body of the animal outside the housing 101.

Furthermore, one end 132 of a first sensor or a piezoelectric device 130 (see FIG. 2) which senses the animal bark stands out between the two electrodes 122. The protruding end is a vibration sensing side terminal of the piezoelectric device 130, and stands out through the housing 101 such that a vibration transmission shaft 133 is covered with a cover 132 of a soft material such as rubber. Thus, when putting the collar 100 on the animal, it is desirable to position the collar 100 such that one end of the piezoelectric device 130 or a front end of the cover 132 touches the neck, preferably, the vocal cords of the animal.

Furthermore, the collar 100 includes a power/setting switch 141 for power ON/OFF, and in order to prevent power OFF by an unintentional contact with an object, the power/setting switch 141 is designed to power OFF when pressed for a predetermined time (for example, 5 seconds) or longer. The power/setting switch 141 may be used not only to power ON/OFF, but also to set or change various initial values or modes of the collar 100, and its detailed description will be provided below.

Furthermore, the collar 100 includes a display 150 to display various initial values or modes and statuses currently set, and the detailed components of the display 150 will be described below.

Furthermore, the collar 100 includes a status indication lamp 105 to display the current status of the collar. The status indication lamp 105 includes, for example, green (or blue), orange, and red color LEDs, to indicate the current status, for example, such as the following.

Green: normal operation
Orange: need to charge the battery (for example, the remaining capacity is 30% or less)
Red: when applying stimulation and need to charge the battery (for example, the remaining capacity is 10% or less)

Meanwhile, the supporting means or the belt 103 may include an insect repellent substance against insects such as fly, mosquito, and flea. The insect repellent may include commercial chemicals or perfumes, and preferably natural extracts, for example, citronella oil.

Figure 2:
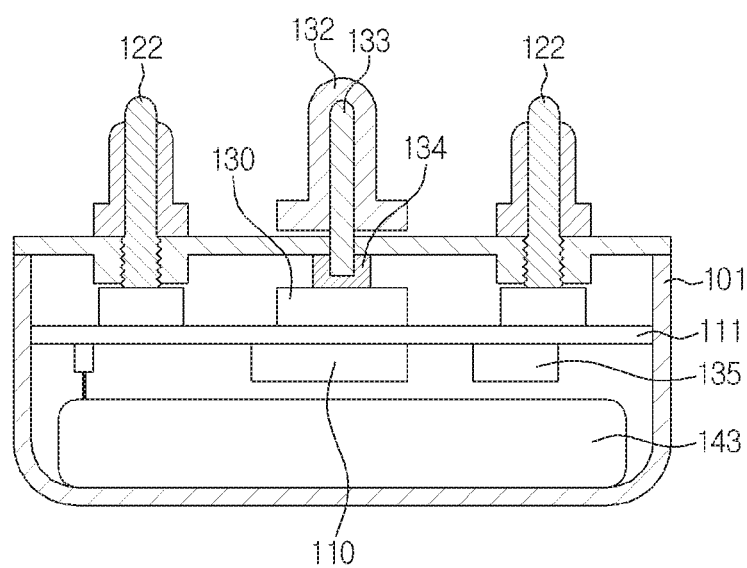
FIG. 2 is a schematic cross-sectional view of the device shown in FIG. 1.
Figure 3:
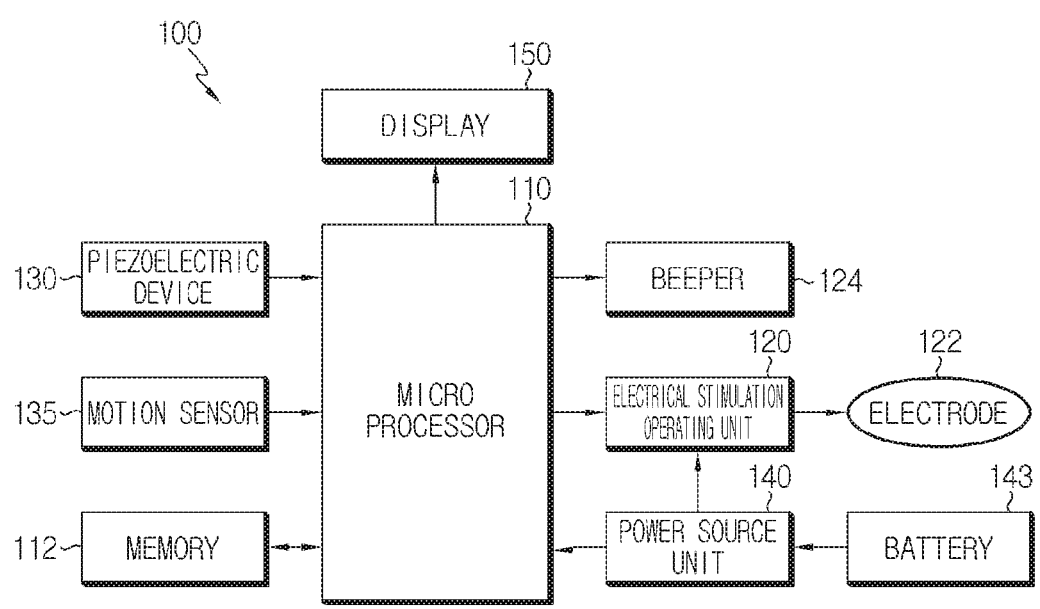
FIG. 3 is a schematic block diagram showing the components of the device shown in FIG. 1.

Furthermore, referring to FIG. 2 schematically showing the cross section and FIG. 3 showing the functional components by blocks, the collar 100 includes the status indication lamp 105, the first sensor or piezoelectric device 130 and the electrical stimulation applying means 120, 122, and a power source unit 140 and a battery 143, a second sensor or a motion sensor 135, memory 112, and a microprocessor 110 as a control unit to control each of the units.

The first sensor 130, the second sensor 135, the memory 113, and the microprocessor 110 are mounted on a circuit board 111 in which circuit devices such as the electrical stimulation operating unit 120 and the power source unit 140 and wiring patterns are formed.

Furthermore, the vibration transmission shaft 133 of the piezoelectric device 130 touches one electrode of the piezoelectric device 130 with a buffering member 134 of a soft material such as rubber interposed between. Accordingly, vibration of the vocal cords sensed through the vibration transmission shaft 133 is transmitted to one electrode of the piezoelectric device 130 through the buffering member 134, and electrical signals (voltage signals) responsive to the pressure are inputted to the microprocessor 110.

The power source unit 140 is supplied with power from the embedded battery 143, and supplies, for example, 5V direct current power necessary to operate the microprocessor 110 and each circuit component of the collar 100, and direct current power necessary for the electrical stimulation operating unit 120.

For the battery 143, primary batteries may be used, but it is preferred to use rechargeable secondary batteries. The battery 143 charging may be carried out through a commercial alternating current power source using a separate component or a charging adapter.

The stimulation applying means is designed to apply a proper stimulation to the animal when the animal barks, and the stimulation applying means is not limited to a particular type if it can transmit a warning message to the animal, and typically may use at least one of sound, vibration, and electrical shock stimulation. This embodiment includes the beeper 124 to apply sound stimulation, and the electrical stimulation operating unit 120 to generate an electrical pulse of low current high voltage (for example, 50 VAC to 10,000 VAC) and the electrodes 122 to apply the generated electrical pulse to the animal. The electrical stimulation operating unit 120 typically includes a transformer to receive low voltage power from the battery 143 and convert it to high voltage pulse.

By providing multiple stimulation types, different types of stimulation may be applied to the animal based on the extent of barking and how often the animal barks.

Meanwhile, independent of multiple or single type of stimulation applying means provided, the intensity of stimulation applied by each stimulation applying means, in particular, the electrical stimulation applying means can be preferably adjusted by the microprocessor 110. By doing so, especially in the case that a single type of stimulation applying means is provided, stimulation of different intensities may be applied based on how often the animal barks. Furthermore, because the intensity of stimulation applied can be adjusted, as the animal barks more frequently, or when the animal does not stop barking in spite of a predetermined intensity of stimulation, stimulation of gradually increasing levels may be applied. However, if the animal keeps barking despite a maximum intensity of stimulation applied for a predetermined time (for example, 10 seconds) or longer, it is desirable to stop to apply stimulation in order to protect the animal.

Though adjustment of the intensity of stimulation to be applied changes depending on the type of stimulation applying means, the intensity of stimulation can be adjusted typically by increasing or decreasing the time during which stimulation is applied, or in the case of sound stimulation (a beeper), by adjusting the intensity or frequency of warning sound, in the case of vibration stimulation (a vibration motor, etc.), by adjusting the intensity or frequency of vibration, and in the case of electrical shock stimulation, by adjusting amplitude (voltage), a pulse width, or a duty ratio of an electrical pulse.

The first sensor or the piezoelectric device 130 converts the vibration of the vocal cords sensed through the cover 132, the vibration transmission shaft 133, and the buffering member 134 as described above to electrical signals (voltage signals) and outputs the electrical signals, and the electrical signals as first sensing signals are inputted to the microprocessor 110.

Meanwhile, sensitivity of the piezoelectric device can be adjusted. That is, if the vibration of the vocal cords sensed when the animal barks is too weak or strong based on the size of the animal or the contact sensitivity of the vibration transmission shaft 133 (the cover 132) with the vocal cords, barks may not be sensed due to weak output signals from the piezoelectric device 130 though the animal really barked, or on the contrary, the animal did not bark, but barks may be sensed, and in this case, it is desirable that a user can adjust sensitivity of the piezoelectric device 130. A detailed method for sensitivity adjustment will be described below.

The second sensor or the motion sensor 135 is an acceleration sensor or a gyro sensor mounted on the circuit board 111, and outputs second sensing signals for calculating the inclination of the collar 100, the acceleration or velocity in the direction perpendicular to the ground, or the angular acceleration or angular velocity of the collar 100 to the ground as described above. Then, the microprocessor 110 determines whether the animal makes a particular motion, i.e., a head raising motion accompanied by barking, by calculating the inclination of the collar 100, the acceleration or velocity in the direction perpendicular to the ground, or the angular acceleration or angular velocity of the collar 100 to the ground from the second sensing signals. Meanwhile, similar to the piezoelectric device 135, it is desirable that sensitivity of the motion sensor 135 can be adjusted.

Furthermore, the second sensor or the motion sensor 135 may be used to implement a sleeping mode for saving power consumption of the collar 100. That is, when there is no input of second sensing signals from the motion sensor 135 for a predetermined time (for example, 5 minutes) or longer, the animal is determined to sleep or take a rest and the collar 100 is switched to a sleeping mode, and when a second sensing signal is inputted during the sleeping mode, the collar 100 is waked up, so that consumption of the battery 143 can be reduced.

The display 150 includes devices such as a 7-segment LCD and a dot matrix LCD that can indicate the numbers of 0~9 and simple English alphabets, and forms a user interface to indicate various initial values or operation modes and statuses of the collar 100 or change the settings. The detailed components of the display 150 will be described below.

Figure 4:
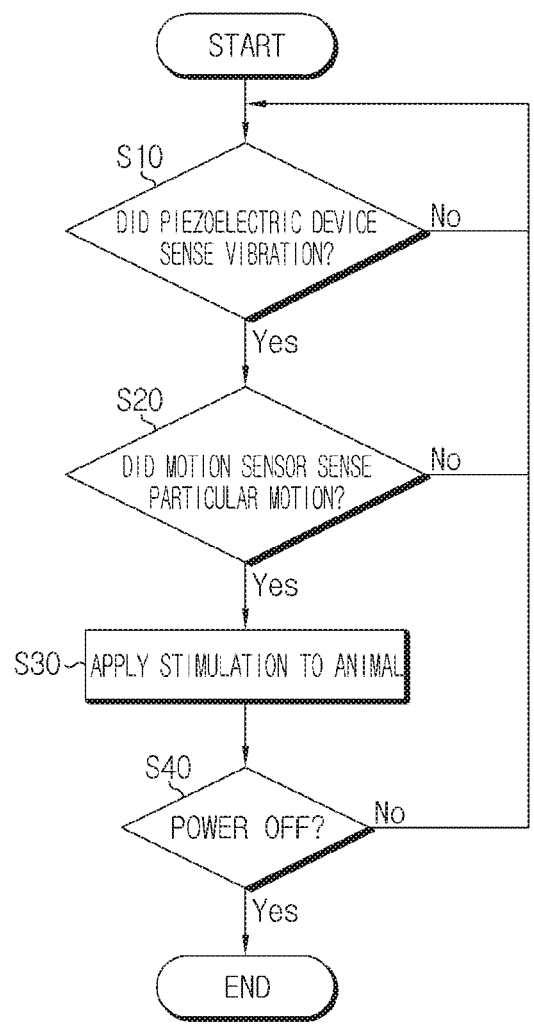
FIG. 4 is a flowchart for illustrating an animal bark control method according to an embodiment of the present disclosure.

Subsequently, referring to the flowchart of FIG. 4, the animal bark control method according to the embodiment of the present disclosure and a method for changing the settings of the collar 100 are described.

First, when the collar 100 is power ON by pressing the power/setting switch 141 for a short time (for example, 0.5 seconds or less), the control unit or the microprocessor 110 continuously receives inputs of first sensing signals and second sensing signals from the first sensor or the piezoelectric device 130 and the second sensor or the motion sensor 135, respectively.

When the first sensing signals (voltage signals) from the piezoelectric device 130 are higher than a predetermined reference voltage, the piezoelectric device 130 determines that the animal barks because vibration from the vocal cords of the animal is higher than or equal to a predetermined reference value (Yes at S10), and moves the flow of control to S20.

At S20, it is determined whether the animal makes a particular motion, i.e., a head raising motion accompanied by barking from the second sensing signals of the second sensor or the motion sensor 135. Specifically, in the case that the motion sensor 135 is an acceleration sensor, when a change in the inclination of the collar 100 to the ground calculated from the second sensing signals is higher than or equal to a predetermined reference value, or when the acceleration or velocity of the collar 100 in the direction perpendicular to the ground calculated from the second sensing signals is higher than or equal to a predetermined reference value, the animal is determined to make the particular motion.

When a result of the determination at S20 is Yes, the microprocessor 110 moves the flow of control to S30 to apply stimulation to the animal. Specifically, the microprocessor 110 operates the stimulation applying means, the electrical stimulation operating unit 120 or the beeper 124, based on the set stimulation mode or stimulation intensity, to apply electrical stimulation or sound stimulation to the animal.

The stimulation mode may include various modes known in the art, typically the following modes:

Apply single/multiple types of stimulation—apply only one of sound stimulation and electrical stimulation, or apply sound (or vibration) stimulation as auxiliary stimulation for a predetermined time (for example, 1 second) and then apply electrical stimulation as main stimulation.

Apply stimulation of fixed/variable intensity—especially in applying electrical stimulation, apply stimulation of fixed intensity (voltage) of preset intensity each time the animal barks, or when the animal barks repeatedly within a predetermined time, gradually increases the intensity, and when the animal does not bark for a predetermined time or longer, gradually decrease the intensity or return to the initial setting value.

Meanwhile, when power is OFF at any time between S10 and S30, the method according to this embodiment ends.

Subsequently, additional functions and a settings changing process of the present disclosure are described.

First, the collar 100 of the present disclosure includes a counter, and each time the animal barks (each time stimulation is applied to the animal), the counter increases and records a value, i.e. the number of barks, and the number of barks is displayed on the display 150, allowing a user to see the learning (training) effect of the collar for the animal. The number of barks recorded in the counter may be initiated to 0 when power is OFF or the user changes the settings.

Subsequently, a settings change process of operation mode or stimulation mode of the collar 100 is described.

When the power/setting switch 141 is pressed for a short time (for example, 1.5 seconds or less) with the collar 100 powered ON, the display 150 changes the display status, for example, in the following order each time the power/setting switch 141 is pressed, and when the power/setting switch 141 is pressed a little bit longer (for example, 1.5~2.5 seconds) in the corresponding display status, the corresponding display flashes with short sound effects and enters a settings change mode. On the other hand, when there is no input for a predetermined time (for example, 10 seconds) or longer, the settings change mode ends in the current status, and the display 150 returns to the following (1) number of barks display status.

(1) Number of barks display status
(2) Stimulation intensity and mode display status
(3) Sensor sensitivity display status
(4) Auxiliary stimulation activation/inactivation display status
(5) Settings display status A method for changing the settings in each display status is as follows:

(1) Number of Barks Display Status

In this display status, the number of times the animal has barked until now (the number of stimulation applied) is displayed in flashing number, and in this state, when the power/setting switch 141 is pressed again for a little long time (for example, for 1.5 seconds~2.5 seconds), the number of barks is reset to 0 with slight long sound effects, and the settings change mode ends.

(2) Stimulation Intensity and Mode Display Status

In this display status, the currently set stimulation intensity is displayed flashingly as the intensity of stimulation to apply when the animal barks, and in this status, when the power/setting switch 141 is pressed for a short time (for example, 1.5 seconds or less), the stimulation intensity increased to the next level flashes, and when the power/setting switch 141 is pressed again for a little long time (for example, for 1.5 seconds~2.5 seconds), the stimulation intensity is set and stored as the stimulation intensity of level that is now flashing with slightly long sound effects and the settings change mode ends, and the display 150 returns to the above (1) number of barks display status.

In this embodiment, the stimulation intensity may be set, for example, as below:

L.0 (level 0): apply only sound stimulation by the beeper 124

L.1~L.8 (level 1~level 8): electrical stimulation of fixed voltage level to be applied by the electrical stimulation applying means 120, 122, that can be set from the lowest level (L.1) to the highest level (L.8)

L.9: variable electrical stimulation applying mode, when the dog barks for the first time, electrical stimulation of the lowest level (L.1) is applied, and when the dog barks again within 3 seconds, electrical stimulation of level increased by one is applied. When the dog does not bark for 10 minutes or longer, the stimulation intensity is reset to the lowest level (L.1).

(3) Sensor Sensitivity Display Status

In this display status, the sensor sensitivity of the first sensor (piezoelectric device) 130 and/or the second sensor (motion sensor) 135 currently set is displayed flashingly, and in this status, when the power/setting switch 141 is pressed for a short time (for example, 1.5 seconds or less), the sensor sensitivity increased to the next level flashes, and when the power/setting switch 141 is pressed again a little bit longer (for example, for 1.5 seconds~2.5 seconds), the sensor sensitivity is set and stored as the sensitivity of level that is now flashing with slightly long sound effects and the settings change mode ends, and the display 150 returns to the above (1) number of barks display status.

In this embodiment, the sensor sensitivity may be adjusted by changing the reference values (voltage value, or inclination change value, acceleration, velocity, angular acceleration, angular velocity) for determining whether the animal barks or the animal makes a particular motion, and may be set as three levels, for example, S.L (Low level), S.n (Intermediate level) and S.H (High level). Further, when the sensitivity of the corresponding sensor (for example, second sensor) is set to 0 (S.0), only one sensor (for example, first sensor) is used to determine barking of the animal.

(4) Auxiliary Stimulation Activation/Inactivation Display Status

In this display status, activation or inactivation of auxiliary stimulation currently set (for example, sound stimulation) is displayed flashingly, and in this status, the power/setting switch 141 is pressed for a short time (for example, 1.5 seconds or less), activation (t.1) and inactivation (t.0) are toggled and flash, and when the power/setting switch 141 is pressed again a little bit longer (for example, for 1.5 seconds~2.5 seconds), auxiliary stimulation is set and stored as activation or inactivation that is now flashing with slightly long sound effects and the settings change mode ends, and the display 150 returns to the above (1) number of barks display status.

In this embodiment, if auxiliary stimulation is activated, when the animal barks, the auxiliary stimulation is applied, for example, for 1 second, and subsequently, the main stimulation, electrical stimulation, is applied with the stimulation intensity set in the above (2). On the other hand, when the auxiliary stimulation is inactivated, the main stimulation, electrical stimulation, is applied with the stimulation intensity set in the above (2) immediately when the animal barks.

(5) Settings Display Status

In this display status, information of each of (1) to (4) currently set and stored is displayed on the display 150 flashingly at a predetermined time interval in a sequential order or in a repeated manner, and in this status, when the power/setting switch 141 is pressed for a short time (for example, 1.5 seconds or less), the display status goes to the next one, i.e., (1) number of barks display status, and when the power/setting switch 141 is pressed a little bit longer (for example, for 1.5 seconds~2.5 seconds), the settings change mode ends with slightly long sound effects, and the display 150 returns to the above (1) number of barks display status.

While the present disclosure has been hereinabove described with regard to a limited number of embodiments and drawings, the present disclosure is not limited thereto and it is obvious that various modifications and changes can be made thereto by persons having ordinary skill in the technical field to which the present disclosure belongs within the technical aspects of the present disclosure and the equivalent scope to which the appended claims are entitled.

For example, the components illustrated and described as functional blocks of the collar 100 in the embodiments are distinguished from a functional perspective and are not mechanically distinguished, and two or more elements may be realized as one circuit component, and on the contrary, an element may be mechanically realized as two or more components.

In addition, although the piezoelectric device 130 is given as an example of the first sensor in the embodiments, a microphone device may be used for the first sensor, and further, both a piezoelectric device and a microphone device may be used.

Further, although sound stimulation by the beeper 124 is given as an example of the auxiliary stimulation in the embodiments, vibration stimulation by a vibration motor, for example, may be used. Further, although electrical stimulation is given as an example of the main stimulation in the embodiments, electrical stimulation is not used, and sound stimulation or vibration stimulation may be used as the main stimulation.

What is claimed is:

1. A dog bark control device, worn on a body of a dog to apply stimulation to the dog when barking of the dog is sensed to stop the dog from barking, the dog bark control device comprising:
    a first sensor configured to sense barking of the dog by sensing a vibration of vocal cords or a barking sound and output a first sensing signal;
    a second sensor configured to sense an inclination of the dog bark control device to the ground, an acceleration or a velocity of the dog bark control device in a direction perpendicular to the ground, or an angular acceleration or an angular velocity of the dog bark control device to the ground, and output a second sensing signal;
    a stimulation applying means configured to apply stimulation to the dog; and
    a control unit programmed to receive inputs of the first sensing signal and the second sensing signal, and operate the stimulation applying means to apply stimulation to the dog dependent upon receiving both the first sensing signal and the second sensing signal,
    wherein the control unit is further programmed to determine that the dog barks when the first sensing signal is a signal indicating that the dog barks, and at the same time, the second sensing signal is a signal indicating that the dog makes a head raising motion such that the control unit simultaneously considers the first sensing signal and the second sensing signal to determine when the dog barks; and
    wherein when at least one of a change in the inclination of the dog bark control device to the ground, the acceleration or velocity of the dog bark control device in a direction perpendicular to the ground, or the angular acceleration and the angular velocity of the dog bark control device to the ground, is more than or equal to a predetermined reference value, the second sensing signal is determined to indicate that the dog makes the head raising motion, the second sensor being an acceleration sensor or a gyro sensor, the first sensor being a piezoelectric device or a microphone device, the first sensor receiving an input of vibration of the vocal cords of the dog or the barking sound of the dog, the first sensor converting the input to an electrical signal and outputting the electrical signal as the first sensing signal.

2. The dog bark control device according to claim 1, wherein sensitivity of at least one of the first sensor and the second sensor is adjustable.

3. The dog bark control device according to claim 1, further comprising a counter and a display, and
    wherein each time the
    unit increase a value of the counter by one and displays the value on the display.

4. The dog bark control device according to claim 1, wherein the stimulation applying means comprises a means for applying an electrical stimulation, and
    the intensity of the electrical stimulation to apply when the dog barks is settable.

5. The dog bark control device according to claim 1, wherein the stimulation applying means comprises a main stimulation means to apply an electrical stimulation, and an auxiliary stimulation means to apply a sound stimulation or a vibration stimulation, and
    when the dog barks, the electrical stimulation from the main stimulation means is immediately applied, or the electrical stimulation from the main stimulation means is applied after the sound stimulation or vibration stimulation from the auxiliary stimulation means is applied for a predetermined period of time.

6. The dog bark control device according to claim 1, wherein the control unit switches the dog bark control device to a sleeping mode when there is no input of the second sensing signal from the second sensor for a predetermined period of time or longer, and when the second sensing signal is inputted during the sleeping mode, wakes up the dog bark control device.

7. The dog bark control device according to claim 1, wherein the dog bark control device is worn on the body of the dog by supporting means, and
    the supporting means includes an insect repellent.

8. A dog bark control method, in which when barking of a dog is sensed, stimulation is applied to the dog using a device worn on a body of the dog to stop the dog from barking, the dog bark control method comprising:
    receiving, by a control unit, input of a first sensing signal from a first sensor which senses barking of the dog by sensing a vibration of vocal cords or a barking sound;
    receiving, by the control unit, input of a second sensing signal from a second sensor which senses an inclination of the device to the ground, an acceleration or a velocity of the device in a direction perpendicular to the ground, or an angular acceleration or an angular velocity of the device to the ground;
    determining, by the control unit, whether the dog barks from the first sensing signal and the second sensing signal; and
    operating, by the control unit, a stimulation applying means to apply stimulation to the when the dog is determined to bark,
    wherein the determining whether the dog barks comprises determining that the dog barks when the first sensing signal is a signal indicating that the dog barks, and at the same time, the second sensing signal is a signal indicating that the dog makes a head raising motion such that the control unit simultaneously considers the first sensing signal and the second sensing signal to determine when the dog barks; and
    wherein when a change in the inclination of the device to the ground, the acceleration or velocity of the device in a direction perpendicular to the ground, or the angular acceleration or the angular velocity of the device to the ground, is more than or equal to a predetermined reference value, the second sensing signal is determined to indicate that the dog makes the head raising motion.

9. The dog bark control method according to claim 8, wherein the second sensor is an acceleration sensor.

10. The dog bark control method according to claim 8, wherein the second sensor is a gyro sensor.

11. The dog bark control method according to claim 8, wherein the first sensor is a piezoelectric device to receive input of vibration of the vocal cords of the dog, and convert it to an electrical signal and output the electrical signal.

12. The dog bark control method according to claim 8, wherein the first sensor is a microphone device to receive input of the barking sound of the dog, and convert it to an electrical signal and output the electrical signal.

13. The dog bark control method according to claim 8, wherein sensitivity of at least one of the first sensor and the second sensor is adjustable, and the method further comprises adjusting the sensitivity of the first sensor and/or the second sensor according to input of a user.

14. The dog bark control method according to claim 8, further comprising:

counting, by the control unit, the number of operations each time the stimulation applying means operates, and displaying it on a display.

15. The dog bark control method according to claim 8, wherein the stimulation applying means comprises a means for applying an electrical stimulation, and the method further comprises setting the intensity of the electrical stimulation to apply when the dog barks.

16. The dog bark control method according to claim 8, wherein the stimulation applying means comprises a main stimulation means to apply an electrical stimulation, and an auxiliary stimulation means to apply a sound stimulation or a vibration stimulation, and the operating the stimulation applying means to apply stimulation to the dog comprises operating, by the control unit, the stimulation applying means to apply the electrical stimulation from the main stimulation means immediately, or to apply the electrical stimulation from the main stimulation means after applying the sound stimulation or vibration stimulation from the auxiliary stimulation means for a predetermined period of time.

17. The dog bark control method according to claim 8, further comprising:

switching, by the control unit, the device to a sleeping mode when there is no input of the second sensing signal from the second sensor for a predetermined period of time or longer; and waking up, by the control unit, the device when the second sensing signal is inputted during the sleeping mode.

\* \* \* \* \*